(12) United States Patent
Satyamoorthy et al.

(10) Patent No.: US 10,283,997 B2
(45) Date of Patent: May 7, 2019

(54) WIRELESS POWER TRANSMISSION STRUCTURES

(71) Applicant: MediaTek Inc., Hsin-Chu (TW)

(72) Inventors: Anand Satyamoorthy, Somerville, MA (US); Patrick Stanley Riehl, Cambridge, MA (US); William Kirwin, Acton, MA (US); Ron-Chi Kuo, Tainan (TW)

(73) Assignee: MediaTek Inc., Hsin-Chu (TW)

( * ) Notice: Subject to any disclaimer, the term of this patent is extended or adjusted under 35 U.S.C. 154(b) by 287 days.

(21) Appl. No.: 14/967,469

(22) Filed: Dec. 14, 2015

(65) Prior Publication Data

US 2016/0181858 A1 Jun. 23, 2016

Related U.S. Application Data

(60) Provisional application No. 62/094,134, filed on Dec. 19, 2014.

(51) Int. Cl.
| | |
|---|---|
| *H02J 5/00* | (2016.01) |
| *H02J 7/00* | (2006.01) |
| *H02J 7/02* | (2016.01) |
| *H04B 5/00* | (2006.01) |

(52) U.S. Cl.
CPC ............. *H02J 7/025* (2013.01); *H02J 5/005* (2013.01); *H02J 7/0042* (2013.01); *H04B 5/0037* (2013.01)

(58) Field of Classification Search
None
See application file for complete search history.

(56) References Cited

U.S. PATENT DOCUMENTS

| | | | |
|---|---|---|---|
| 7,211,986 B1* | 5/2007 | Flowerdew | H02J 7/025 320/108 |
| 2012/0169278 A1* | 7/2012 | Choi | H04B 5/0037 320/108 |
| 2012/0235504 A1* | 9/2012 | Kesler | H03H 7/40 307/104 |
| 2013/0063084 A1* | 3/2013 | Tilvis | H01F 27/28 320/108 |

(Continued)

FOREIGN PATENT DOCUMENTS

| | | |
|---|---|---|
| CN | 101836272 A | 9/2010 |
| CN | 102570630 A | 7/2012 |
| WO | WO 2014118615 A2 | 8/2014 |

OTHER PUBLICATIONS

EP15201353.8, dated Mar. 2, 2016, European Search Report.
European Search Report dated Mar. 2, 2016 for European Patent Application No. 15201353.8.

*Primary Examiner* — Jared Fureman
*Assistant Examiner* — Aqeel Bukhari
(74) *Attorney, Agent, or Firm* — Wolf, Greenfield & Sacks, P.C.

(57) ABSTRACT

A wireless power transfer apparatus includes a support structure having a top surface and a side surface. The support structure is configured to support a mobile device on the top surface and a wearable device at the side surface. The wireless power transfer apparatus also includes a plurality of transmit coils within the support structure. The plurality of transmit coils are configured to wirelessly transmit power to the mobile device on the top surface and the wearable device at the side surface.

16 Claims, 7 Drawing Sheets

(56) References Cited

U.S. PATENT DOCUMENTS

| | | |
|---|---|---|
| 2013/0093252 A1 | 4/2013 | Norconk et al. |
| 2013/0093253 A1 | 4/2013 | Norconk et al. |
| 2013/0143519 A1* | 6/2013 | Doezema ........... G08B 21/0446 |
| | | 455/404.2 |
| 2014/0184155 A1 | 7/2014 | Cha |
| 2015/0372498 A1* | 12/2015 | Ichikawa ............ B60L 11/1803 |
| | | 307/104 |
| 2016/0036245 A1* | 2/2016 | Chang .................... H01F 38/14 |
| | | 307/104 |

* cited by examiner

WIRELESS POWER TRANSMISSION STRUCTURES

CROSS-REFERENCE TO RELATED APPLICATIONS

This application claims priority to U.S. provisional application Ser. No. 62/094,134, titled "3D Wireless Charger," filed Dec. 19, 2014, which is hereby incorporated by reference in its entirety.

BACKGROUND

1. Technical Field

The techniques described herein relate to wireless power transfer, and in particular to a wireless power transfer apparatus that can wirelessly transfer power to a mobile device and a wearable device, and to a wireless power transfer apparatus that can wirelessly transfer power to an electronic device within a cavity.

2. Discussion of the Related Art

Wireless Power Transfer Systems (WPTS) are gaining increasing popularity as a convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) have been working on developing international standards for consumer products based on wireless power transfer.

WPTS have been developed that can charge multiple mobile devices at the same time. Such devices include a charging pad that can accommodate multiple mobile devices on the surface of the charging pad.

SUMMARY

Some embodiments relate to a wireless power transfer apparatus. The wireless power transfer apparatus includes a support structure having a top surface and a side surface. The support structure is configured to support a mobile device on the top surface and a wearable device at the side surface. The wireless power transfer apparatus also includes a plurality of transmit coils within the support structure. The plurality of transmit coils are configured to wirelessly transmit power to the mobile device on the top surface and the wearable device at the side surface.

Some embodiments relate to a wireless power transfer apparatus. The wireless power transfer apparatus includes a support structure configured to accommodate an electronic device at a side surface of the support structure. The wireless power transfer apparatus also includes an upper transmit coil and a lower transmit coil within the support structure. The upper and lower transmit coils have current that flows in opposite directions and produce magnetic fields that constructively interfere with one another at the side surface.

Some embodiments relate to a wireless power transfer apparatus. The wireless power transfer apparatus includes a support structure having a cavity configured to accommodate an electronic device. The wireless power transfer apparatus also includes an upper transmit coil and a lower transmit coil within the support structure. The upper and lower transmit coils have current that flows in opposite directions and produce magnetic fields that constructively interfere in the cavity to wirelessly transmit power to the electronic device.

Some embodiments relate to a method of operating a wireless power transfer apparatus. The method includes energizing the upper and lower transmit coils with current that flows in opposite directions to produce magnetic fields that constructively interfere with one another at a side surface or within a cavity of a support structure.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wearable computing devices, such as smartwatches, for example, are becoming increasingly popular. Wearable computing devices (hereinafter "wearable devices") can provide a user interface that extends the capabilities of a mobile device, and/or can monitor the activity level and/or physiological information of a user using one or more sensors. As with mobile devices, wearable devices are typically powered by batteries and need to be re-charged regularly.

Described herein is a wireless power transfer apparatus that can accommodate both a wearable electronic device and a mobile device, and which allows wireless power transmission to both devices simultaneously. In some embodiments, the wireless power transfer apparatus has a support structure sized and shaped to allow a wearable device to be positioned at the side of the support structure while a mobile device is placed on top of the support structure. The support structure accommodates at least one transmit coil shaped and positioned to transmit wireless power to both the wearable device and the mobile device.

Figure 1:
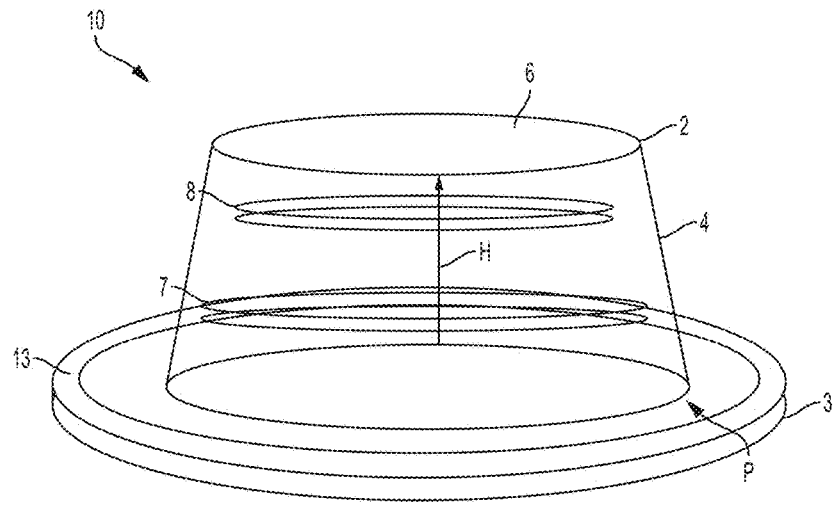
FIG. 1 shows a perspective view of a wireless power transfer apparatus that can wirelessly transmit power to both a wearable device and a mobile device, according to some embodiments.

FIG. 1 shows a perspective view of a wireless power transfer apparatus 10 that can wirelessly transmit power to both a wearable device and a mobile device, according to some embodiments. Wireless power transfer apparatus 10 has a support structure 2 that can accommodate transmit coils 7 and 8 for transmitting power wirelessly to device(s) positioned at a top surface 6 and a side surface 4 of the support structure. The transmit coils include at least one lower transmit coil 7 and at least one upper transmit coil 8. Transmit coils 7 and 8 are schematically illustrated in FIG. 1 and are discussed in further detail below. Support structure 2 may be formed on a base 3. In some embodiments, the support structure 2 may have a ridge 13 to guide the wearable device 12 into a suitable position for wireless power transfer.

Figure 2:
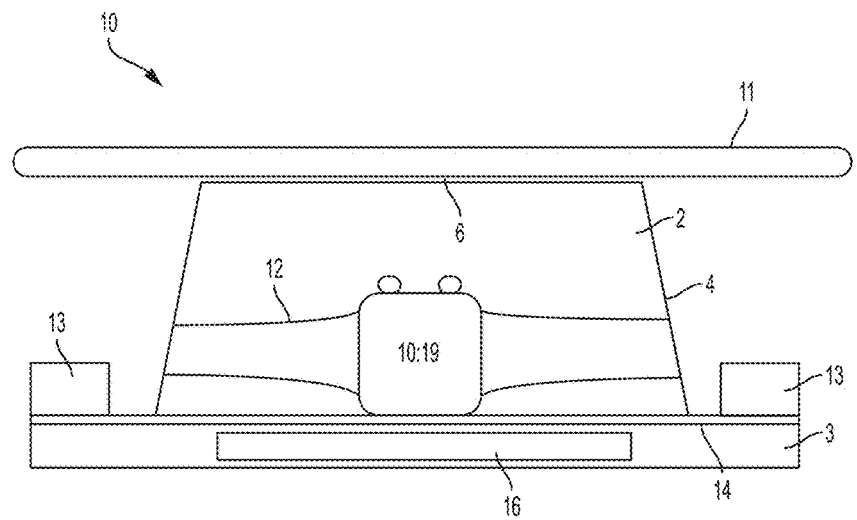
FIG. 2 shows a side view of the wireless power transfer apparatus of FIG. 1.

FIG. 2 shows a side view of wireless power transfer apparatus 10. FIG. 2 shows a mobile device 11 may be placed on the top surface 6 of the support structure 2, and a wearable device 12 (e.g., a smartwatch) may be placed at the side surface 4 of the support structure 2. If wearable device 12 is a smartwatch, it may be wrapped (at least partially) around the side surface 4 of the support structure 2, as shown in FIG. 2. Wearable device 12 may be positioned at any angular position around the perimeter of the support structure 2. In operation, transmit coils 7 and 8 may be energized to wirelessly transmit power to both mobile device 11 and wearable device 12 simultaneously, which can provide an effective solution for charging both a mobile device and a wearable device. Mobile device 11 may be a battery-powered device such as a cellular telephone, a smartphone, a tablet computer, or any other mobile device that can be balanced on top of support structure 2 in a position and orientation that facilitates wireless power transfer. Wearable device 12 may be a battery-powered computing device that may be worn by a person, such as a watch, a smartwatch, or any other suitable type of wearable device such as a fitness tracking device, a wireless headset, smart glasses, etc.

In some embodiments, support structure 2 and base 3 may be formed of a rigid plastic material. However, the techniques described herein are not limited as to the material(s) forming support structure 2 and base 3.

In some embodiments, and as shown in FIGS. 1 and 2, the cross section of the support structure 2 may be ellipsoidal, such as circular, for example. However, the cross section of the support structure 2 need not be ellipsoidal, and in some cases may be square or rectangular, or have another suitable cross section. In some embodiments, and as shown in FIGS. 1 and 2, the support structure 2 may be tapered such that it has a smaller width at the top 6 than at the base 3. Tapering the support structure in this manner allows the side surface 4 to be angled toward the center of the wireless power transfer apparatus 10, which can facilitate resting a high aspect ratio wearable device, such as a smartwatch, at the side surface 4, which can prevent the wearable device 12 from tipping over. However, the techniques described herein are not limited in this respect, as in some embodiments the side surface 4 may be vertical or may be tapered in the opposite direction. In some embodiments, the top surface 6 of the support structure 2 may be flat. However, the top surface 6 need not be flat, and may have another shape suitable for supporting a mobile device 11.

In some embodiments, the support structure 2 may have a height H above the base 3 of between 2 cm and 15 cm. Such dimensions may be suitable for accommodating a wearable device 12 between the base 3 and mobile device 11. In some embodiments, the perimeter P of the support structure 2 (e.g., at the base 3) may be between 8 cm and 20 cm. Such a perimeter may allow the wearable device 12 such as a smartwatch to be at least partially wrapped around the support structure 2.

In some embodiments, and as illustrated in FIG. 2, the base may be covered by magnetic shield 14 having a layer of ferrite or other high magnetic permeability material to help shield the electronic circuitry 16 in the base from the charging magnetic field. In some embodiments, the magnetic shield 14 may have a relative magnetic permeability of greater than 2, greater than 10, greater than 50 or greater than 100, by way of example. In some embodiments, electronic circuitry 16 includes one or more components of wireless power transmitter 102 as discussed below in connection with FIG. 12.

Figure 3:
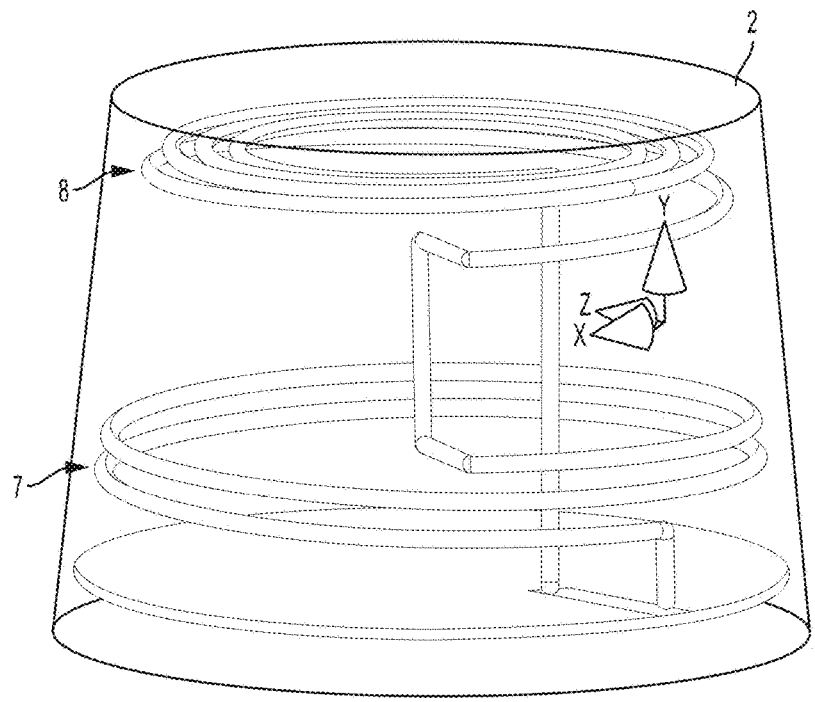
FIG. 3 shows a more detailed view of the transmit coils, according to some embodiments.

FIG. 3 shows a more detailed view of transmit coils 7 and 8, according to some embodiments. In some embodiments, transmit coils 7 and 8 may be in series with one another, and driven by the same current. Vertical connections between the transmit coils 7 and 8 may be formed through the center of the support structure 2, as shown in FIG. 3, to minimize asymmetry of the external magnetic field. However, the techniques described herein are not limited to transmit coils 7 and 8 being connected to one another, as transmit coils 7 and 8 may be driven separately in some embodiments. Transmit coils 7 and 8 may be driven in phase or with a phase relationship with respect to one another.

In some embodiments, transmit coil 7 may have two turns, as illustrated in FIG. 3. However, the techniques described herein are not limited in this respect, as transmit coil 7 may have any number of turns, such as one turn, two turns, three turns, or more.

In some embodiments, transmit coil 8 may include a spiral-shaped winding near the upper surface 6 of the support structure 2 that produces a magnetic field above the upper surface 6 to provide power wirelessly to a device (e.g., mobile device 11) positioned on top of the support structure 2. In some embodiments, the transmit coil 8 may provide a uniform magnetic field over the upper surface 6 of the support structure 2.

In some embodiments, the transmit coils 7 and 8 may be wound so that current flows in the opposite direction in transmit coil(s) 7 as compared to transmit coil(s) 8. For example, current may flow in the counterclockwise direction in transmit coil(s) 7 and in the clockwise direction in transmit coil(s) 8, or vice versa. Providing current flow in opposite directions in transmit coils 7 and 8 produces constructive interference of their magnetic fields at the side surface 4 of support structure 2 between the transmit coils 7 and 8, which can facilitate wirelessly transmitting power to wearable device 12.

Figure 4:
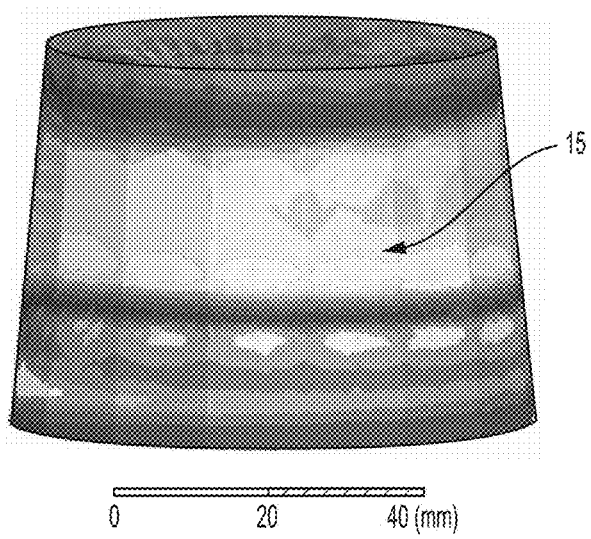
FIG. 4 shows a finite element analysis of the structure of FIG. 3, and illustrates constructive interference of the magnetic fields produced by the transmit coils at the side surface of the support structure.

FIG. 4 shows a finite element analysis of the structure of FIG. 3, and illustrates constructive interference of the magnetic fields produced by transmit coils 7 and 8 at the side surface 4 of support structure 2 between the transmit coils 7 and 8. As seen in FIG. 4, the field is relatively uniform along a band 15 that extends around the perimeter of the support structure 2. Accordingly, a wearable device 12 placed at any angular location around the side surface 4 can be charged wirelessly using the magnetic field produced in this region.

Figure 5:
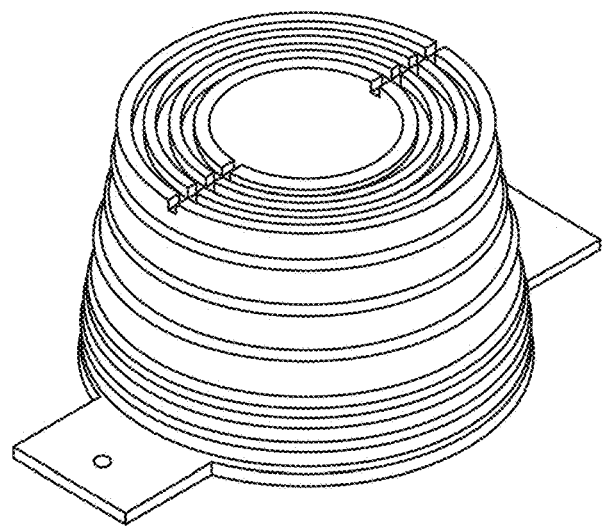
FIG. 5 illustrates a coil form with terraces and grooves that facilitates forming the windings of the transmit coils.
Figure 6:
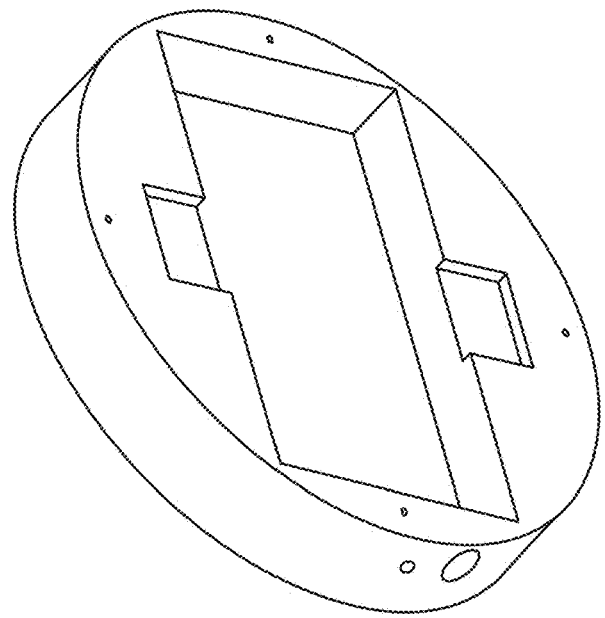
FIG. 6 shows a base which may house electronics for driving the transmit coils.
Figure 7:
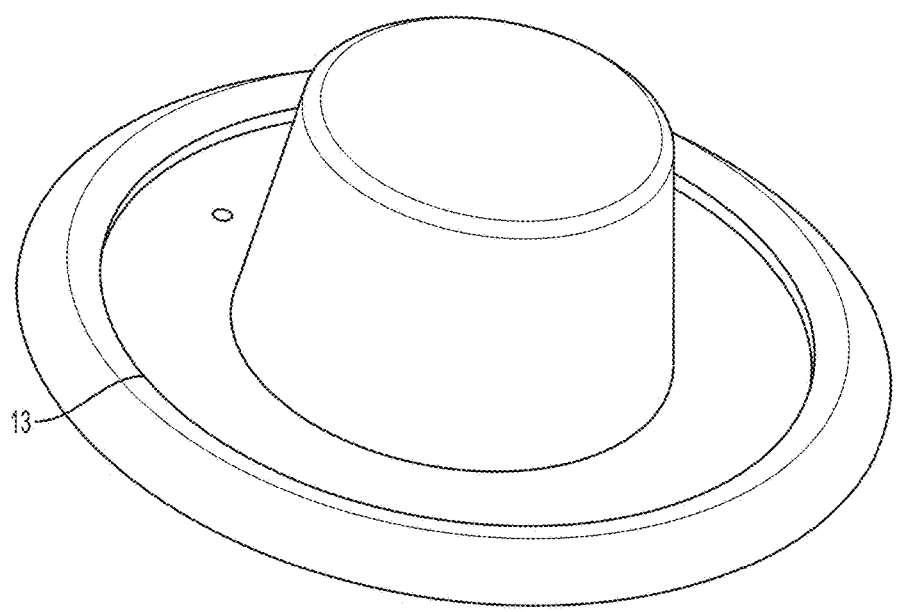
FIG. 7 shows a cover that may be placed over the coil form and the base.

FIG. 5 illustrates a coil form with a grooved structure that facilitates winding the transmit coils 7 and 8. Wire may be wound around the grooves in the sides of the form, and placed in the grooves on the top surface. The coil form may be attached to be base, as shown in FIG. 6, by fitting the bottom flanges of the coil form into the matching recesses in the base. In some embodiments, the base may house electronics for driving the transmit coils 7 and 8, such as one or more inverters and control circuitry. FIG. 7 shows a cover that may be placed over the coil form and the base. In some embodiments, the ridge 13 may be formed on the cover.

Figure 8:
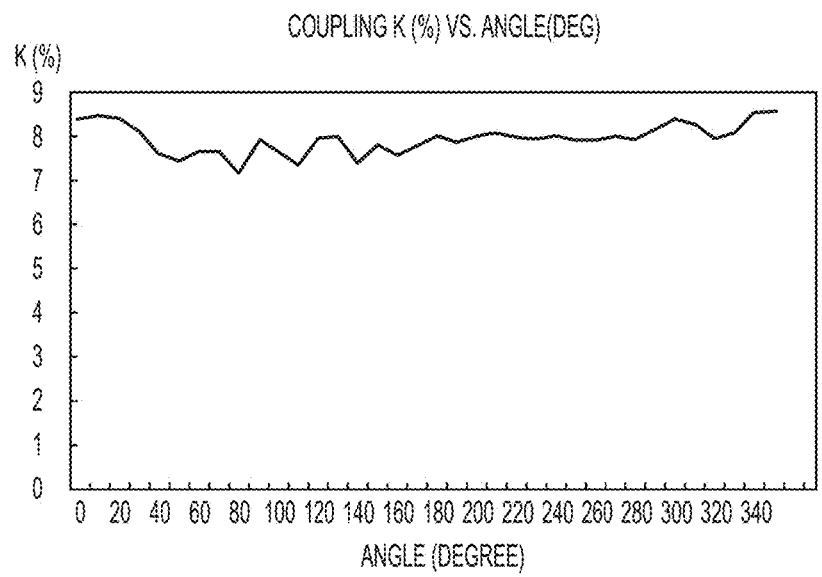
FIG. 8 shows a plot of the coupling coefficient K vs. angle when a receiver coil is placed on the side surface at various angular positions.

FIG. 8 shows a plot of the coupling coefficient K vs. angle when a receiver coil is placed on the side surface 4 at various angular positions around the side surface 4. FIG. 8 shows the coupling coefficient K is relatively uniform, in the range of 7-9%, for different angular positions.

Figure 9:
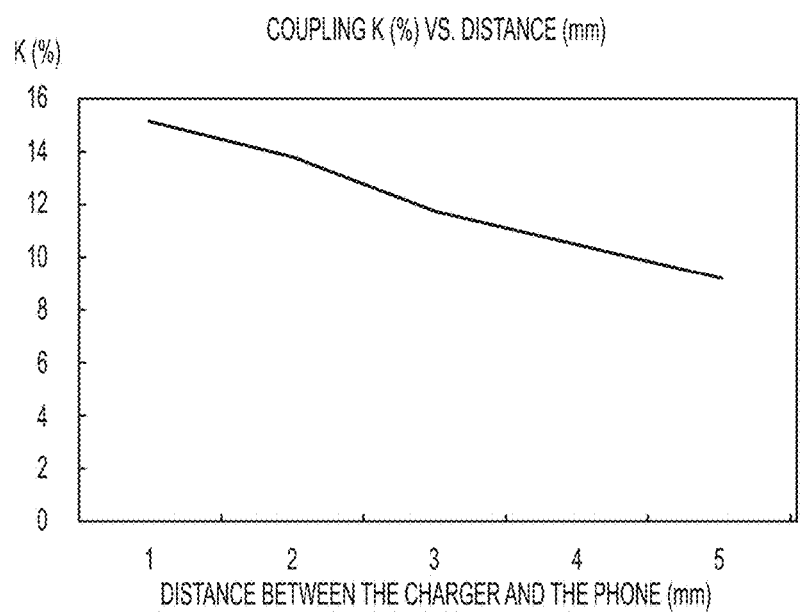
FIG. 9 shows a plot of the coupling coefficient K vs. distance when a receiver coil is placed above the top surface at different distances from the top surface.

FIG. 9 shows a plot of the coupling coefficient K vs. distance when a receiver coil is placed above the top surface 6 at different distances from the top surface 6. As shown in FIG. 9, the coupling coefficient K starts at about 15% at a distance of 1 mm and decreases to about 9% at a distance of 5 mm.

In view of these coupling coefficients, the apparatus may be particularly well-suited to MR wireless power transfer, as MR wireless power transmitters do not require a high coupling coefficient.

Figure 10:
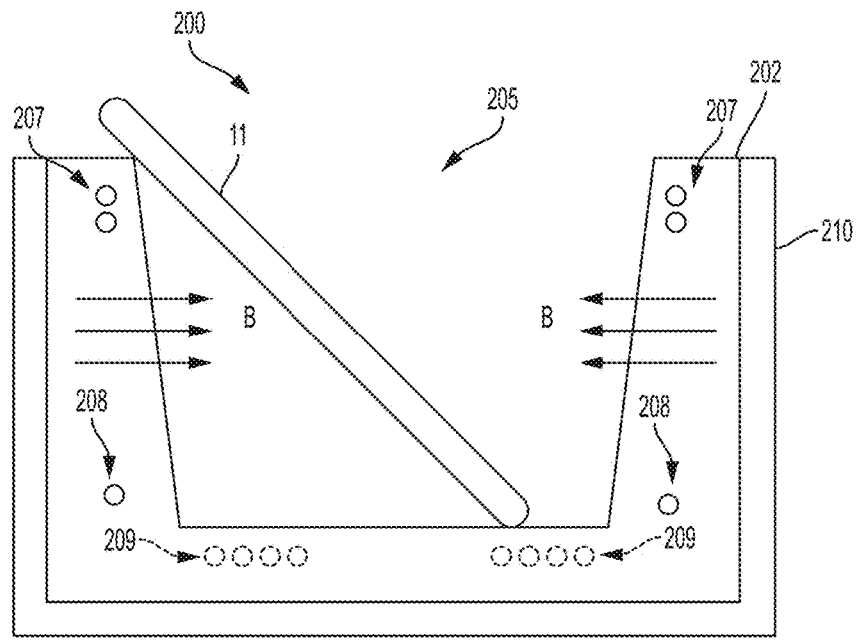
FIG. 10 shows a side view of a wireless power transfer apparatus in which power can be provided to device(s) placed in a cavity, according to some embodiments.
Figure 11:
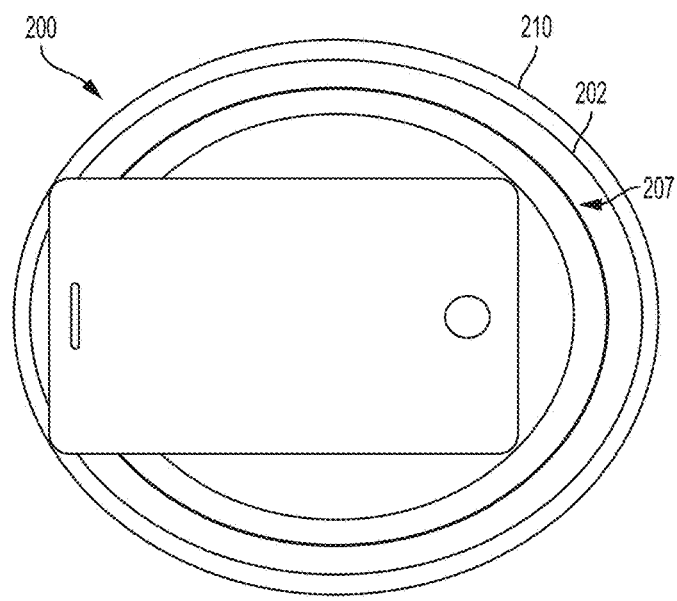
FIG. 11 shows a top view of the wireless power transfer apparatus of FIG. 10.

Some embodiments relate to charging electronic devices placed in a cavity. FIG. 10 shows a side view of wireless power transfer apparatus 200 in which power can be provided to device(s) placed in a cavity 205, according to some embodiments. FIG. 11 shows a top view of the wireless power transfer apparatus 200. Wireless power transfer apparatus 200 includes a support structure 202 that houses transmit coils 207 and 208, each of which may include one or more turns. Transmit coils 207 and 208 may have the same or similar characteristics as wireless transmit coils 7 and 8 discussed above. Transmit coils 207 and 208 may have current flowing in opposite directions to produce constructive interference that concentrates magnetic flux B in the cavity 205, which can facilitate wireless power transfer to a mobile device 11. The magnetic flux B is illustrated in FIG. 10. Of course, the flux directions may be reversed depending on the direction of current flow in the transmit coils. Optionally, transmit coil(s) 208 may include a bottom portion 209 which may be positioned below cavity 205. Bottom portion 209 may allow charging one or more smaller devices, such as wearable devices, for example, which may be placed at the bottom of the cavity 205. In some embodiments, the bottom portion 209 may be spiral-shaped. In some embodiments, the wireless power transfer apparatus 200 may be enclosed along the sides and/or bottom in an optional layer of ferrite or other suitable high-permeability material, to provide a closed path for the return magnetic flux. A layer of high-permeability material 210 formed on the sides and bottom of the wireless power transfer apparatus 200 is shown in FIGS. 10 and 11. Such a layer of high magnetic permeability may be a magnetic shield that inhibits stray magnetic fields from extending beyond the enclosure, which may prevent stray fields from interfering with nearby electronic circuits. The layer of high magnetic permeability may have a relative magnetic permeability of greater than 2, greater than 10, greater than 50 or greater than 100, in some embodiments.

Support structure 202 may have any suitable shape, such as a cup-shape or other vessel-like shape. In some embodiments, wireless power transfer apparatus 200 may be integrated into a cup holder or other compartment of a vehicle.

Figure 12:
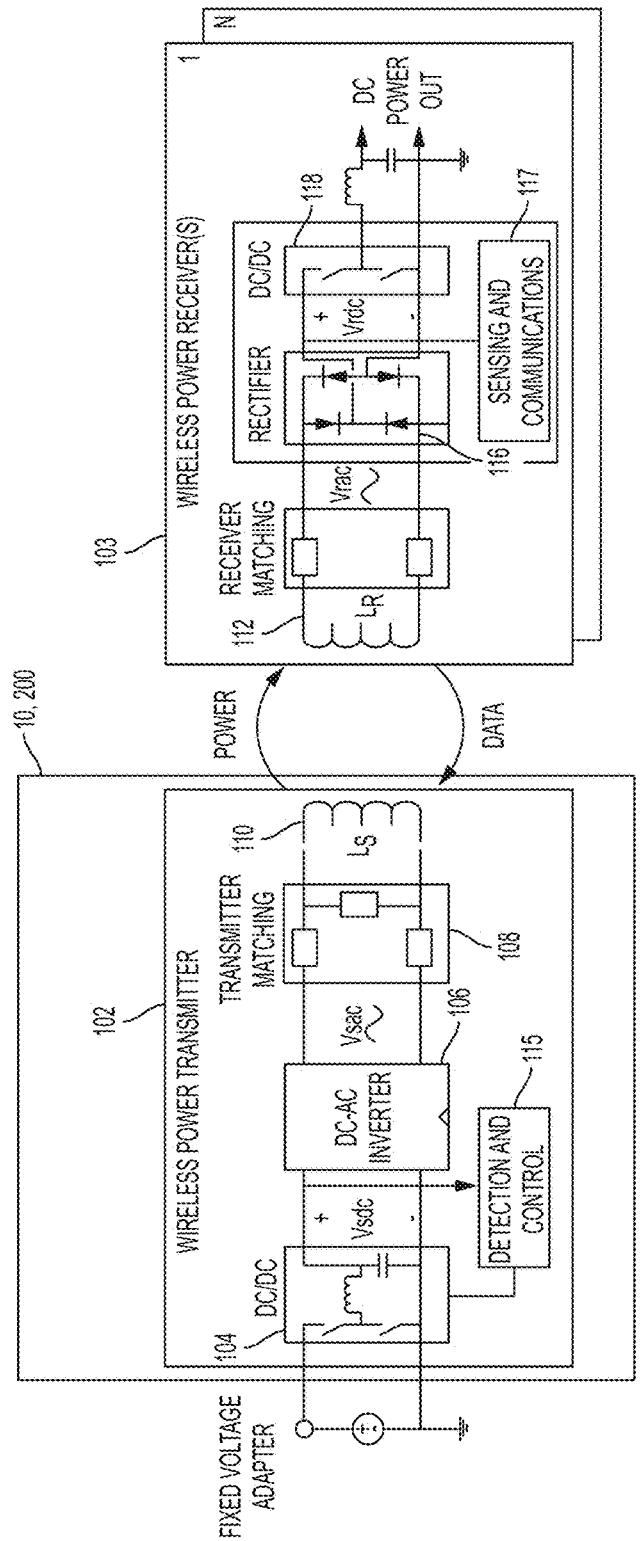
FIG. 12 shows a power chain for a wireless power system.

A power chain for a wireless power system is shown in FIG. 12. The wireless power transmitter 102 receives a fixed voltage from a DC adapter. The fixed adapter voltage is scaled by a DC/DC converter 104 and applied to an inverter 106. However, in some embodiments, the DC adapter output voltage may be controllable, rather than fixed, which may allow eliminating the DC/DC converter 104. The inverter, in conjunction with the transmitter matching network 108, generates an AC current in the transmit coil(s) 110. The AC current in the transmit coil(s) 110 generates an oscillating magnetic field in accordance with Ampere's law. The oscillating magnetic field induces an AC voltage into a tuned receiver coil 112 of a wireless power receiver 103 in accordance with Faraday's law. The AC voltage induced in the receiver coil 112 is applied to a rectifier 116 that generates an unregulated DC voltage. Though shown as including diodes, the rectifier 116 may be a synchronous rectifier, in some embodiments. The unregulated DC voltage is regulated using a DC/DC converter 118, which is filtered and provided to a load. In some alternate embodiments the DC/DC converter 118 can be replaced by a linear regulator or battery charger, or eliminated altogether.

The wireless power transmitter 102 may use a closed loop power control scheme. The power control scheme allows individual device power needs to be met while providing high efficiency and safe receiver operation. The sensing and communications circuit 117 of the wireless power receiver senses the power demands of the load by measuring the voltage and/or current at the input of the DC/DC converter 118. Instantaneous receiver power is fed back to the wireless power transmitter 102 using a communication channel, shown as the arrow labeled "Data" in FIG. 12. Any suitable communication channel may be used, and may be in accordance with wireless communication standards such as Bluetooth or Near Field Communication (NFC), or by modulating the receiver coil 112, by way of example and not limitation. The sensing and communications circuit 117 sends data regarding the power demands of the receiver to the wireless power transmitter 102. A detection and control circuit 115 of the wireless power transmitter 102 detects the signal from the wireless power receiver 103 and adjusts the output voltage of the DC/DC converter 104 in order to satisfy the power requirements of the wireless power receiver 103.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transfer apparatus, comprising:
   a support structure having a top surface and a side surface, the support structure being configured to support a mobile device on the top surface and a wearable device at the side surface; and
   a plurality of transmit coils within the support structure, the plurality of transmit coils being configured to wirelessly transmit power to the mobile device on the top surface and the wearable device at the side surface,
   wherein the plurality of transmit coils comprises a first transmit coil that conducts current in a first direction and a second transmit coil that conducts current in a second direction opposite to the first direction to produce constructive interference at the side surface; and
   wherein the first transmit coil comprises a spiral-shaped winding proximate the top surface of the support structure.

2. The wireless power transfer apparatus of claim 1, wherein the plurality of transmit coils are connected in series.

3. The wireless power transfer apparatus of claim 1, wherein the support structure has a central axis, and wherein the plurality of transmit coils are configured to wirelessly transmit power to the wearable device when the wearable device is placed on the side surface at any angular position about the central axis.

4. The wireless power transfer apparatus of claim 1, wherein the support structure has a height of between 2 cm and 15 cm.

5. The wireless power transfer apparatus of claim 1, wherein the support structure has a perimeter of between 8 cm and 20 cm.

6. The wireless power transfer apparatus of claim 1, further comprising a base housing circuitry that drives the plurality of transmit coils, wherein the support structure extends above the base.

7. The wireless power transfer apparatus of claim 1, further comprising a base having a ridge to position the wearable device at the side surface.

8. The wireless power transfer apparatus of claim 7, wherein the base houses circuitry to drive the plurality of transmit coils and the wireless power transfer apparatus further comprises a magnetic shield between the plurality of transmit coils and the circuitry.

9. A wireless power transfer apparatus, comprising:
   a support structure having a cavity configured to accommodate an electronic device; and
   an upper transmit coil and a lower transmit coil within the support structure, the upper and lower transmit coils having current that flows in opposite directions to produce magnetic fields that constructively interfere in the cavity to wirelessly transmit power to the electronic device,
   wherein the upper transmit coil and/or the lower transmit coil surrounds the cavity.

10. The wireless power transfer apparatus of claim 9, wherein the upper and lower transmit coils are connected in series.

11. The wireless power transfer apparatus of claim 9, wherein a compartment of a vehicle comprises the support structure.

12. The wireless power transfer apparatus of claim 11, wherein the compartment comprises a cup holder.

13. The wireless power transfer apparatus of claim 9, further comprising a magnetic shield around a side of the upper and lower transmit coils.

14. The wireless power transfer apparatus of claim 13, wherein the magnetic shield surrounds the side of the upper and lower transmit coils and is also formed below the lower transmit coil.

15. The wireless power transfer apparatus of claim 9, wherein the cavity has a shape defined by an interior surface the support structure and the support structure is configured to accommodate the electronic device within the cavity.

16. The wireless power transfer apparatus of claim 15, wherein the shape is a cylindrical shape.

* * * * *